No. 879,183. PATENTED FEB. 18, 1908.
J. C. LEWIS.
GAME COUNTER.
APPLICATION FILED OCT. 10, 1907.
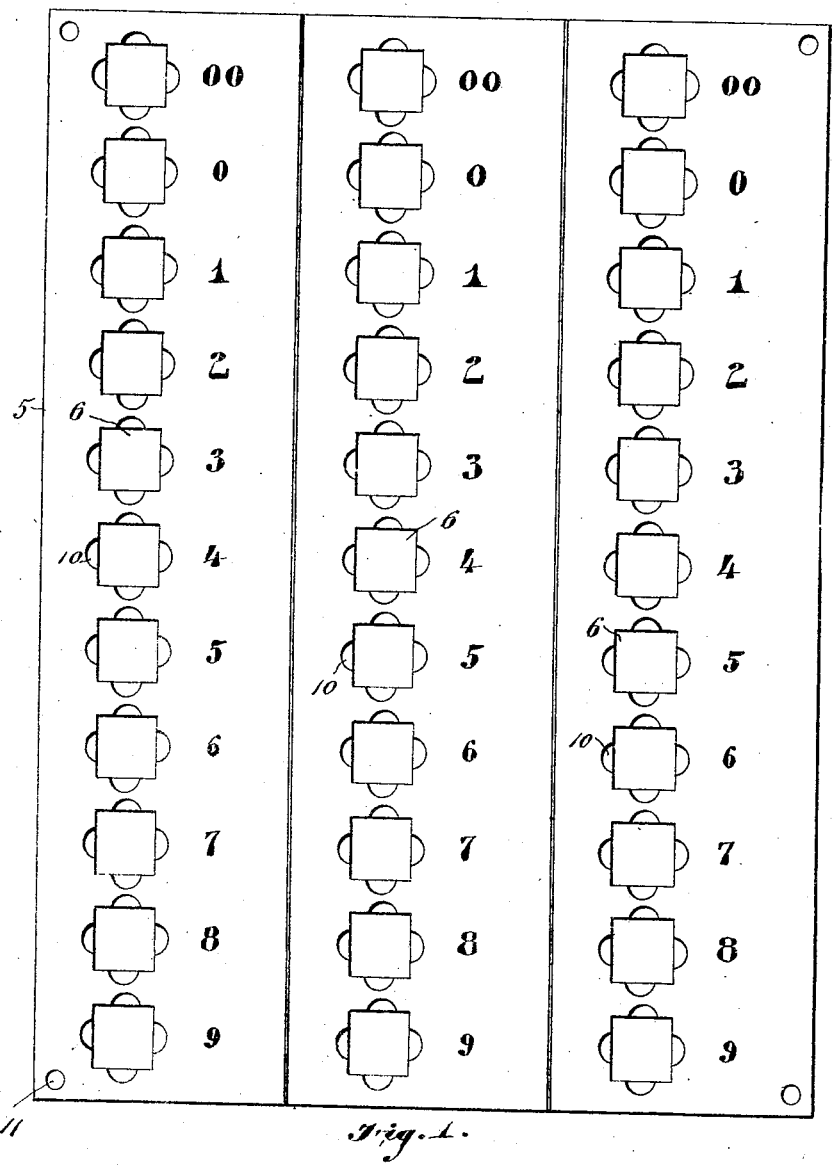
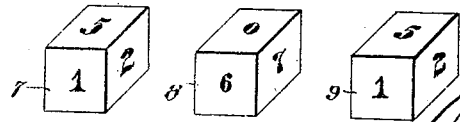
Fig. 1.
Fig. 2.
Jason C. Lewis
Inventor
Witnesses
Arthur Wesley
M. A. Schmidt
By
Attorneys

UNITED STATES PATENT OFFICE.

JASON C. LEWIS, OF ELDRED, ILLINOIS.

GAME-COUNTER.

No. 879,183.　　　Specification of Letters Patent.　　　Patented Feb. 18, 1908.

Application filed October 10, 1907. Serial No. 396,824.

*To all whom it may concern:*

Be it known that I, JASON C. LEWIS, a citizen of the United States, residing at Eldred, in the county of Greene and State of Illinois, have invented certain new and useful Improvements in Game-Counters, of which the following is a specification.

This invention is a game-counter, and has for its object to provide a simple, convenient, and easily operated apparatus for keeping the score in a game of billiards, pool, cards, etc.

The invention comprises a board having a plurality of holes, and numbers adjacent thereto, such holes and numbers representing different orders, as units and tens; together with a block bearing numbers on its faces and adapted to be placed in the holes with one of its numbered faces exposed and coöperating with the number on the board adjacent thereto to indicate the score.

In the accompanying drawing, Figure 1 is a front elevation, or face view of the board, and Fig. 2 is a perspective view of the blocks used in connection therewith.

Referring specifically to the drawing, 5 denotes a board in the face of which are a series of cubical holes 6 which extend vertically in a row. The board has as many of such rows of holes as there are players whose score is to be kept. In the drawing three rows of holes are shown, thus adapting the counter for three players. There are eleven holes in each row, and to the right of each hole the board bears a numerical character, two ciphers being placed to the right of the top hole, one cipher to the right of the next hole below, and to the left of the remaining holes are placed the numerals 1 to 9 inclusive, one below the other in their order.

At 7 is indicated a cube which bears on its faces the numerals 1 to 5 respectively, one face of the cube being left blank or bearing a cipher. Another cube 8 bears on its faces the numerals 6 to 9 respectively, two of its faces being left blank. A third cube, indicated at 9, bears the numerals 1 to 6 on its faces.

The rows of holes 6, and the numerical characters of the board adjacent to said holes represent different orders, the holes, except the one opposite the two ciphers, representing tens, and the characters 1 to 9 representing units.

The apparatus is used as follows: To record a score of 15 for instance, the cube 7 is placed in the hole 6 which is adjacent the numeral 5 in such a position that the numeral 1 on the cube will be exposed. The board then displays the numerical character 15, and as the other holes on the board are empty, the score will be apparent at a glance. If at the next play, the score is 68 for instance, the cube 7 will be removed and the cube 8 placed in the hole 6 opposite the numeral 8 with the numeral 6 on said cube exposed. The board then displays the number 68. If the score runs up into the hundreds, cube 9 will be used in connection with the hole 6 which is opposite the two ciphers. For recording a score of less than 10, the cube 7 or 8 will be placed in the hole 6 adjacent the required numeral on the board, with the cipher or blank space on said cube exposed.

By the apparatus herein described the score can be readily and accurately kept, it is easily operated, and by reason of its simplicity of construction it can be cheaply produced.

The apparatus will be made in different sizes according to the game in connection with which it is to be used. For card games it will be of small size so that it may be laid on a table. In order to distinguish the score of each player or each set of players, each player's portion of the board and the cubes may be differently colored. The cubes fit snugly in the holes 6 with their exposed face extending flush therewith, and the board on each side of the holes has nicks 10 into which the fingers may be placed to facilitate the removal of the cubes from the holes. The board has screw-eyes 11 for attachment to a wall or other support, or it may be hung up or supported in any other suitable manner. The number of rows of holes and coöperating numerical characters may be increased if desired, it being understood that one of such rows is provided for each player as well as one set of cubes.

I claim:—

1. A game-counter comprising a board having a row of holes therein, and numerical characters adjacent the holes, said holes and characters representing different orders, and a block having numerical characters on its faces, and adapted to be placed in said holes with one of its faces exposed.

2. A game-counter comprising a board having a plurality of numerals thereon, a block having numerals on its faces, and means for supporting said block on the board adjacent the numerals thereon, with one of the faces of the block exposed and the numeral thereon coöperating with the adjacent numeral on the board to indicate the score, the numerals of the block and those of the board representing different orders.

In testimony whereof I affix my signature, in presence of two witnesses.

JASON C. LEWIS.

Witnesses:
A. W. BECHDOLDT,
P. T. LISLES.